United States Patent
Degrauwe et al.

(10) Patent No.: US 7,015,794 B2
(45) Date of Patent: Mar. 21, 2006

(54) ACTIVE TRANSPONDER WITH MEANS ALLOWING THE MAXIMUM COMMUNICATION DISTANCE TO BE VARIED

(75) Inventors: Marc Degrauwe, Chez-le-Bart (CH); Jürg Rudin, Salvenach (CH); Thierry Roz, Prêles (CH)

(73) Assignee: EM Microelectronic-Marin SA, Marin (CH)

( * ) Notice: Subject to any disclaimer, the term of this patent is extended or adjusted under 35 U.S.C. 154(b) by 633 days.

(21) Appl. No.: 09/822,222

(22) Filed: Apr. 2, 2001

(65) Prior Publication Data
US 2001/0028302 A1  Oct. 11, 2001

(30) Foreign Application Priority Data
Apr. 6, 2000 (EP) ................. 00201262

(51) Int. Cl.
*H04Q 5/22* (2006.01)
(52) U.S. Cl. .................. 340/10.4; 340/10.1
(58) Field of Classification Search ...... 340/10.1–10.5, 340/5.61, 5.1, 10.34
See application file for complete search history.

(56) References Cited

U.S. PATENT DOCUMENTS

| | | | | |
|---|---|---|---|---|
| 4,333,072 A | * | 6/1982 | Beigel | ..................... 340/10.34 |
| 5,444,222 A | | 8/1995 | Inoue | |
| 5,537,672 A | * | 7/1996 | Grabow et al. | ............. 455/132 |
| 5,648,761 A | | 7/1997 | Kreft et al. | |
| 5,721,552 A | * | 2/1998 | Rossius et al. | ............... 342/51 |
| 5,821,525 A | * | 10/1998 | Takebayashi | ............... 235/492 |
| 5,945,920 A | | 8/1999 | Maletsky | |
| 6,070,803 A | * | 6/2000 | Stobbe | ....................... 235/492 |
| 6,377,203 B1 | * | 4/2002 | Doany | ......................... 342/44 |
| 6,380,845 B1 | * | 4/2002 | Tuttle | ..................... 340/10.34 |
| 6,685,096 B1 | * | 2/2004 | Degrauwe et al. | .......... 235/492 |

FOREIGN PATENT DOCUMENTS

| | | |
|---|---|---|
| DE | 43 33 964 A | 4/1995 |
| GB | 2 321 746 A | 8/1998 |
| JP | 10-154216 A | 6/1998 |

* cited by examiner

Primary Examiner—Michael Horabik
Assistant Examiner—Kimberly Jenkins
(74) Attorney, Agent, or Firm—Griffin & Szipl, P.C.

(57) ABSTRACT

The active transponder is intended for several applications or to operate in various modes requiring different levels of security. Security is controlled by varying the maximum communication distance to a reader. The active transponder includes a battery (2) powering the various electronic circuits amplifying component (8), a module (4) forming a demodulator for the incoming signals, and a component for validating the data comprised in the signals, and a data processing unit (10). The unit includes circuit (12) for controlling the maximum communication distance between the transponder and a reader transmitting signals at a determined power. Circuit (12) sends a security signal (S1, S2) respectively to the data validating component and/or to the signal amplifying component. This signal is used either to control the value of the reference value of the validating component, or to vary the gain of the amplifying component to vary the maximum communication distance.

7 Claims, 2 Drawing Sheets

ACTIVE TRANSPONDER WITH MEANS ALLOWING THE MAXIMUM COMMUNICATION DISTANCE TO BE VARIED

FIELD OF THE INVENTION

The present invention concerns active transponders associated with identification systems or transaction systems of various natures. More particularly, the present invention concerns an active transponder intended for several different applications or having various operating modes with different security levels.

BACKGROUND OF THE INVENTION

Unlike passive transponders which draw their energy from received electromagnetic signals, an active transponder has an internal electric power supply which powers the electronic circuits independently of the level of induced voltage in the antenna of the transponder.

The active transponder may take different forms, in particular the form of a card, electronic tag, and more generally a portable unit. The transponder can operate in modes requiring different degrees of security, in particular for the different applications for which the transponder is intended. Controlling the security of an application may exist at different levels, in particular the communication protocol. In the case of the present invention, one is concerned in particular with controlling the security of an operating mode or a selected application by limiting the communication distance between a reader which transmits with a given power and the transponder.

The present invention thus proposes answering the security problem generated by a multi-application active transponder. It is proposed, in particular, to integrate in the same transponder applications of the "access to a building or means of transport" type and of the banking type for monetary transactions requiring a high level of security. For obvious reasons, it is clear that the maximum communication distance between a transponder and a transceiver, hereinafter a "reader", constitutes an important parameter.

A particular object of the present invention is to provide an active transponder intended for various applications requiring different degrees of security and the arrangement of which is relatively easy and inexpensive, while assuring a high level of efficiency for controlling the various degrees of security required.

SUMMARY OF THE INVENTION

The present invention therefore concerns an active transponder whose electronic unit is arranged so as to control several applications or operating modes and which includes: a data processing unit, means for amplifying the incoming signals received by the transponder antenna, and means for validating these incoming signals as a function of mean induced voltages in the antenna. These validating means supply to the data processing unit a validating signal for the data contained in an incoming signal when its mean voltage on the input side of this unit is greater than or equal to a determined reference voltage. This active transponder is further characterised in that it includes means for varying the maximum communication distance to a reader as a function of the application selected or activated, or the operating mode selected or activated, these means being arranged to vary the amplification gain of said amplification means and/or said reference voltage of said validating means.

According to a preferred arrangement, the validating means include means for measuring the mean induced voltage of the incoming signals and a comparator determining or detecting whether this mean induced voltage is greater than or less than a reference voltage defining a threshold value for validating the data comprised in the incoming signals.

According to a first embodiment which will be described hereinafter, the reference voltage is variable and defined by a security signal. According to a second embodiment which is also described hereinafter, the reference voltage is fixed while the amplification gain is variable and defined by a security signal such that its value is relatively low when the application selected or activated is provided with a high security level.

Thus, according to the invention, it is possible to vary efficiently and significantly the maximum communication distance between a transponder and a reader with a given transmission power. In fact, by acting on the amplification gain and/or the reference voltage defining a threshold below which the received data are not validated by the data processing circuit, one has efficient means which do not require an additional complex electronic arrangement. Further, the variation in the maximum communication distance requires no additional communication means to those provided for a conventional transponder, any information necessary for controlling the level or degree of security being drawn from the electromagnetic signals provided by the reader within the scope of the communication provided in the transponder.

BRIEF DESCRIPTION OF THE DRAWINGS

The present invention will be described in more detail hereinafter with the aid of the following description, with reference to the annexed drawings, given by way of non-limiting example, in which.

DETAILED DESCRIPTION OF THE INVENTION

Figure 1:
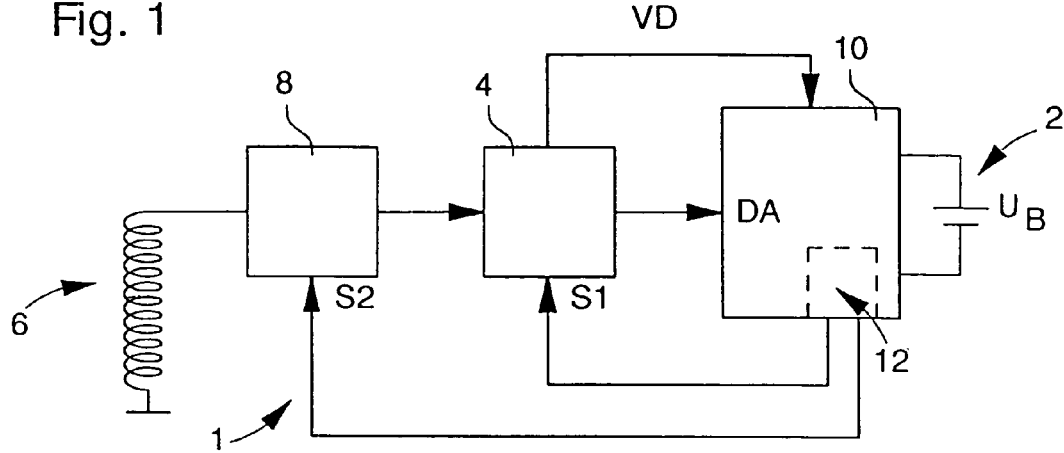
FIG. 1 shows schematically and generally a transponder according to the invention.

The active transponder 1 of FIG. 1 includes a battery 2 supplying a voltage $U_B$ for powering the electronic unit of the transponder including an electronic module 4 forming means for demodulating the incoming signals through antenna 6 and means for validating the data comprised in these signals. In the case of amplitude modulation, the demodulating means effect waveform detection of the received signal. They include in particular a rectifier. The electronic unit also includes means 8 for amplifying the incoming signals and a unit 10 for processing decoded signals DA. Unit 10 includes a circuit 12 for controlling the maximum communication distance from transponder 1 to a reader which is not shown.

Circuit 12 is arranged to supply a security signal S1, S2 respectively to the data validating means arranged in input module 4 and/or to incoming signal amplifying means 8. This security signal is used to vary the maximum communication distance as a function of an application or an operating mode selected or activated in transponder 1. The control of the maximum communication distance for a same transponder will be described more precisely hereinafter with reference to FIGS. 2 to 4.

Figure 2:
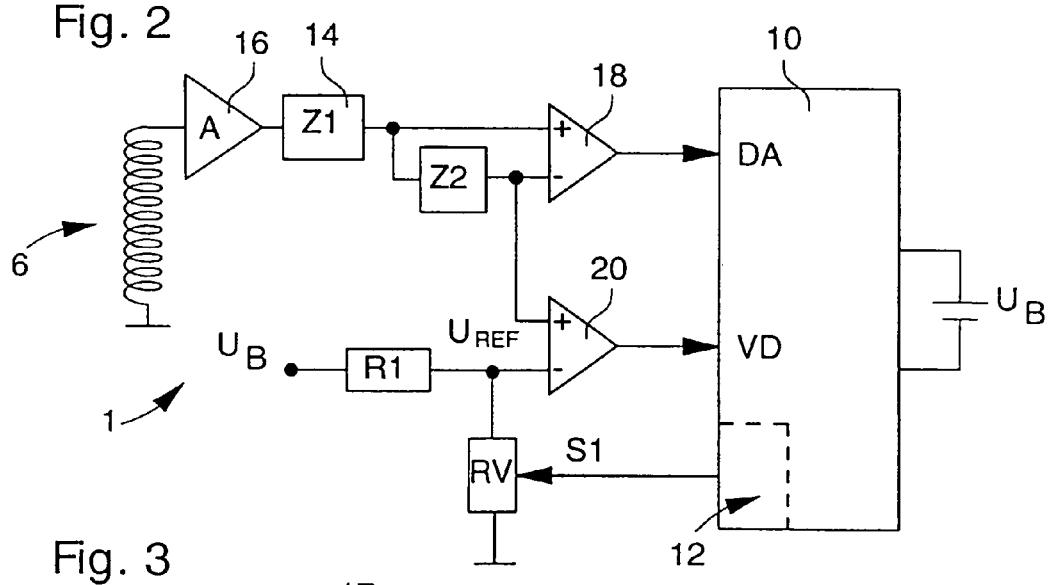
FIGS. 2 and 3 show respectively first and second embodiments of the invention.

FIG. 2 shows a first particular embodiment of the invention. The electromagnetic signals entering transponder 1 via antenna 6 generate an induced voltage therein which is amplified by fixed gain amplifier 16. These signals carry digitally coded data in particular by amplitude modulation. It will be noted however, that the invention applies to any other type of coding. Demodulating unit 14 includes a filter symbolised by Z1 used to remove the signal component which originates from the electromagnetic signal carrier. The output of unit 14 is connected to a comparator 18 and also to a second filter Z2.

Filter Z2 is a low-pass filter used to supply at the output thereof a voltage signal corresponding to the mean voltage of the signal demodulated by unit 14. This mean voltage signal is supplied on the one hand to comparator 18 so that the latter supplies a digital signal at its output, in particular a binary signal, with high states and low states which are respectively positive and negative. The mean voltage of the incoming signals is also supplied to a first input of a comparator 20 belonging to means for validating the data comprised in the incoming signals. The second input of comparator 20 has a voltage $U_{REF}$. Thus, when the mean voltage of the incoming signal is greater than $U_{REF}$, a validating signal VD is supplied to unit 10 for processing data DA. In the opposite case, a non validating signal for this data is supplied.

According to the invention, voltage $U_{REF}$ is varied. In order to do this, in a non-limiting manner, a variable resistor RV is provided, connected to the second input of comparator 20 and also to a fixed resistor R1 supplied with a fixed voltage, in particular voltage $U_B$ of battery 2. Variable resistor RV is controlled by a security signal S1 supplied by maximum communication distance control circuit 12. According to the application or operating mode selected or activated, reference voltage $U_{REF}$ will be relatively high or low. In order to increase security, i.e. to reduce the maximum distance, voltage $U_{REF}$ is set in a high state relative to the value of such voltage for a lower security application or operating mode, i.e. allowing a relatively high communication distance.

Figure 3:
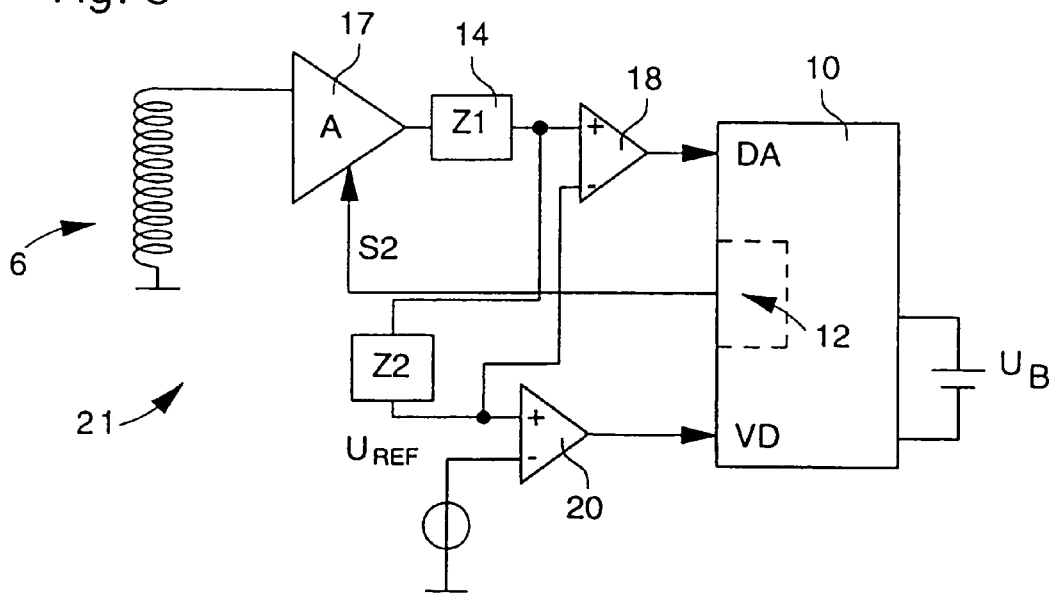

FIG. 3 shows a second particular embodiment of a transponder 21 according to the invention. The references already described hereinbefore will not be described again here in detail. Here, the variation in the maximum communication distance occurs via a variation in the gain of the input amplifier 17. This gain is controlled by a security signal S2 supplied by circuit 12 of electronic unit 10. The received signal, once amplified and demodulated, is supplied on the one hand to comparator 18 and then to unit 10 in the form of bits, and on the other hand to low-pass filter Z2 which supplies the mean voltage of the amplified signal to the first input of comparator 20. According to whether this mean voltage is greater than or less than fixed reference voltage $U_{REF}$, signal VD either validates or does not validate the data contained in the incoming signal. In order to increase security and thus to reduce the maximum communication distance, the amplification gain is set at relatively low value. Thus, the mean voltage of the amplified signal is relatively low and data is only validated for limited distances between the transponder and a reader.

It will be noted that within the scope of the present invention, the demodulating means, the validating means and the incoming signal amplifying means may intervene in a different order depending on the embodiment provided.

Figure 4:
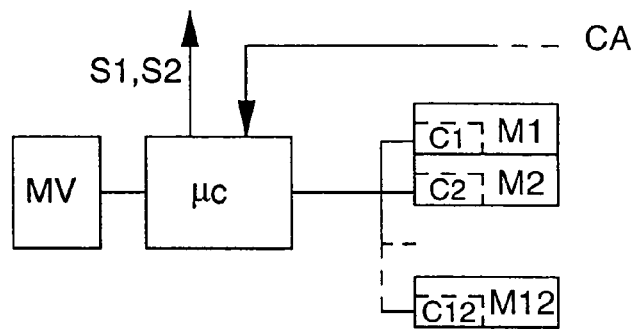
FIG. 4 shows schematically a variant of a part of the electronic unit of the transponder used for controlling the maximum communication distance.

FIG. 4 shows schematically the arrangement of maximum communication distance control unit 12. According to the application selected or activated, a signal CA is sent to a microcontroller $\mu c$. This signal CA is representative of this application. In a first variant, signal CA is supplied directly by the transceiver in the identification or starting phase of a given application. In another variant, the transponder recognises the application or operating mode selected and itself sends signal CA. In a programmable or non-programmable memory various units M1, M2 . . . Mn are provided, corresponding to the various applications and/or operating modes provided. In each of these units a security code C1, C2, . . . Cn is recorded, corresponding to the levels of security required for the corresponding applications and/or operating modes. The microcontroller $\mu c$ reads the security code corresponding to the application or operating mode selected and write it in a random access memory MV. In response to signal CA, the microprocessor supplies security signal S1, S2 to control respectively the value of reference voltage $U_{REF}$ and/or the amplification gain of amplifier 16.

Figure 5:
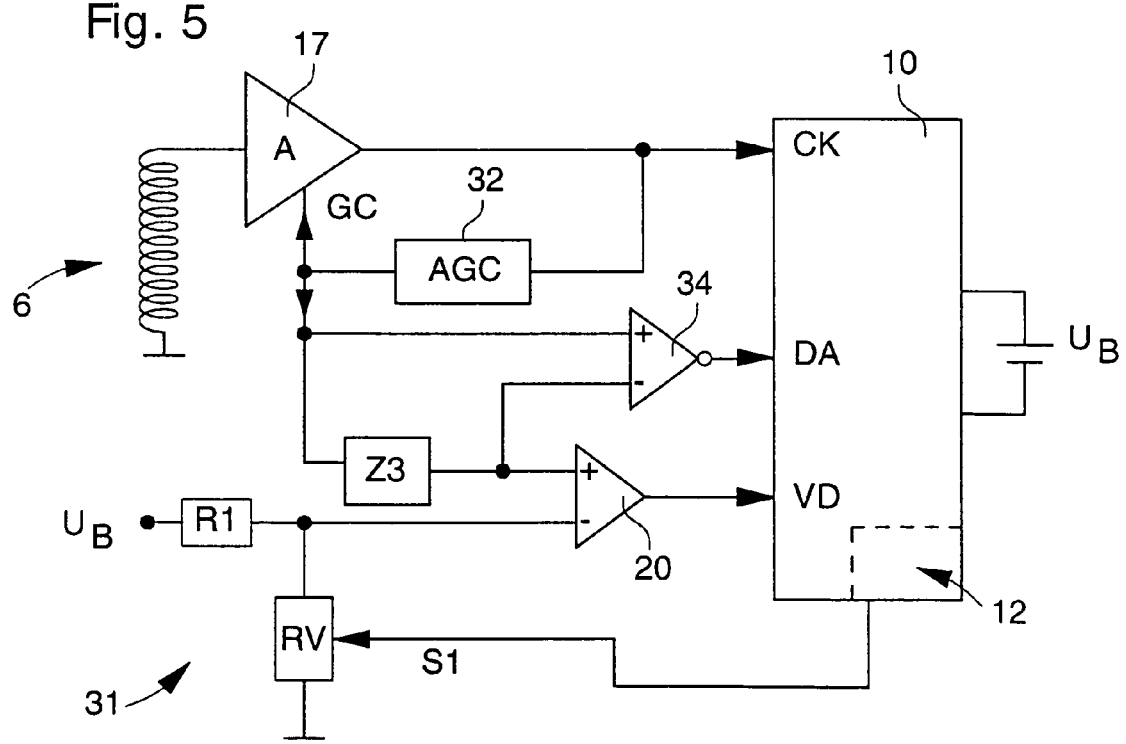
FIG. 5 shows schematically a third embodiment of the invention.

FIG. 5 shows schematically a third embodiment of a transponder 31 according to the invention. The references which have already been described will not be described in detail again here.

Electromagnetic signals received by antenna 6 are amplified by variable gain amplifier 17 the output of which is connected to an automatic gain control unit 32 (abbreviation AGC). The gain is controlled by unit 32 such that the amplitude of the outgoing signal is substantially constant. Thus, the outgoing signal from the amplifier defines a clock signal CK, which is supplied to electronic unit 10. The gain control signal GC has a substantially opposite profile to the amplitude of the waveform of the received electromagnetic signal. Consequently, circuit 32 also forms a demodulator for the modulated incoming signals with inversion between the high and low states. It is thus possible to exploit this signal GC to supply digital data DA to unit 10 by reversing this signal using a comparator-inverter 34. The mean voltage of signal GC is obtained using a low-pass filter Z3. This mean voltage is supplied to comparator-inverter 34 and to comparator 20 to form validating signal VD. Control of the maximum communication distance is effected in a similar manner to the first embodiment described hereinbefore with reference to FIG. 2.

Other variants and embodiments can be conceived by those skilled in the art on the basis of the teaching contained in the present description of the invention.

What is claimed is:

1. An active transponder including:
    an electronic unit arranged so as to control several applications or operating modes;
    an antenna for receiving incoming signals carrying data; and
    an electric power supply connected to said electronic unit, wherein said electronic unit includes:
        a data processing unit;
        means for amplifying incoming signals received by said antenna, and
        means for validating the incoming signals as a function of mean induced voltages in said antenna, wherein the validating means supplies to said data processing unit a validating signal for data contained in a first incoming signal when a mean voltage on an input side of the data processing unit is greater than or equal to a determined reference voltage, wherein the data processing unit includes means for varying the maximum communication distance to a reader or transceiver as a function of the application selected from said several applications or the operating mode selected from said operating modes, wherein the means for varying the maximum communication distance is arranged to vary one or both of amplification gain of said amplification means and said reference voltage of said validating means.

2. A transponder according to claim 1, wherein said validating means includes a comparator having a first input and a second input, wherein the first input is connected to means supplying the mean induced voltage of the incoming signal, before or after said means for amplifying incoming signals, and the second input is connected to means supplying said reference voltage.

3. A transponder according to claim 2, wherein said reference voltage is variable and defined by a security signal so that the value of said reference voltage is relatively high when the selected application or operating mode is provided with a high level of security.

4. A transponder according to claim 2, wherein said reference voltage is fixed, and said amplification gain is variable and defined by a security signal so that the value of said amplification gain is relatively low when the selected application or operating mode is provided with a high level of security.

5. A transponder according to claim 3, wherein said means for varying the maximum communication distance includes a memory in which a security code is stored for each application and for each operating mode able to be selected in the transponder, wherein these security codes are used to generate said security signal.

6. A transponder according to claim 4, wherein said means for varying the maximum communication distance includes a memory in which a security code is stored for each application and for each operating mode able to be selected in the transponder, wherein these security codes are used to generate said security signal.

7. A transponder according to claim 1, wherein the electric power supply is a battery.

\* \* \* \* \*